Oct. 9, 1951 J. C. REED, JR 2,571,060
BEACON MODULATOR CIRCUIT
Filed Oct. 26, 1945
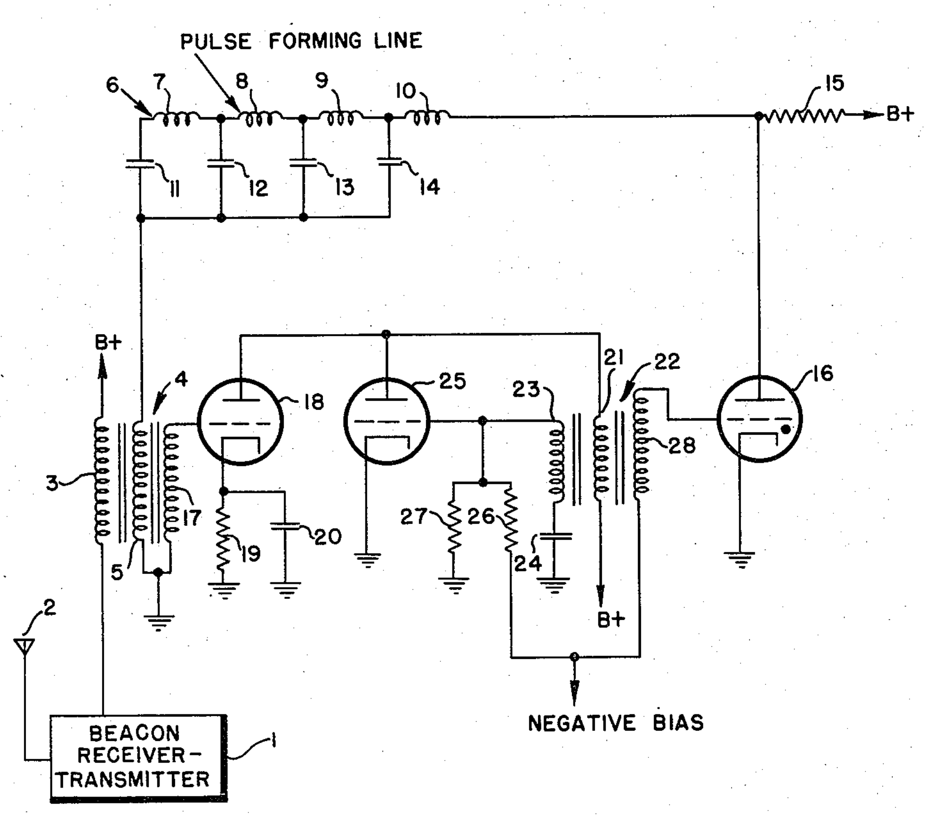
INVENTOR.
JOHN C. REED JR.
BY William D. Hall,
ATTORNEY Patented Oct. 9, 1951

2,571,060

UNITED STATES PATENT OFFICE 2,571,060

BEACON MODULATOR CIRCUIT

John C. Reed, Jr., Boston, Mass., assignor, by mesne assignments, to the United States of America as represented by the Secretary of War Application October 26, 1945, Serial No. 624,908

5 Claims. (Cl. 250—15)

This invention relates to radio beacons in general and in particular to an electrical circuit for modulating a beacon transmitter.

In radio beacons, particularly in the lightweight, portable type, it is desirable to have a simple, compact modulating unit for modulating the output of the beacon. It is accordingly an object of the invention to devise a modulator circuit adapted to be used in a compact, lightweight modulator.

It is also desirable in beacons using a single vacuum tube for transmitting and receiving, to cut off the video amplifier tube so that its low grid to cathode impedance will not load the output. It is a further object of the invention to devise a circuit to cut off the video amplifier tube during the modulator pulse.

Other objects and advantages will become readily apparent from the hereinafter described specification.

The modulator is best adapted for use in beacons using a single tube for both transmitting and receiving and in which the transmitter can be pulsed by applying a positive pulse to the anode of the tube. The modulator may, however, be used with beacons using separate transmitting and receiving tubes.

The circuit uses a three winding input-output transformer. One winding connects a receiver-transmitter tube to a source of positive potential. A second winding is connected between ground and a pulse forming line. The third winding is connected between ground and a control grid of a video amplifier tube. When the beacon is interrogated a video signal is applied to the first winding. This signal is impressed on the grid of the video amplifier tube by the second winding. The output of the video amplifier is used to trigger a blocking oscillator tube, which is normally biased to cut off. The pulse from the blocking oscillator is applied to a grid of a grid-controlled gas tube which is normally biased to cut off. This gas tube should be of a type, such as the 2D21, which deionizes rapidly. The positive pulse on the grid of the gas tube causes it to conduct and discharge the pulse forming line. The discharge of the pulse forming line through the transformer winding causes a negative pulse to be impressed on the grid of the video amplifier tube, cutting it off and at the same time the winding applies a positive pulse to the transmitter tube, causing it to transmit a pulse of R.-F. energy.

The preferred embodiment of the invention is shown in the single figure of the drawing hereinafter described.

The beacon receiver-transmitter 1 receives and transmits over a single antenna 2. The output of the receiver is connected to the winding 3 of input-output transformer 4. The positive anode supply potential is connected to the receiver-transmitter through the transformer winding 3 and the same lead is used as for the receiver output. The winding 5 of the transformer is connected between the pulse forming line 6 and ground. The lumped constant pulse forming line is composed of inductance coils 7, 8, 9 and 10 and capacitors 11, 12, 13, and 14. The high potential side of the pulse forming line is connected to a source of positive potential through resistor 15 and also to the anode of the grid-controlled gas tube 16. The cathode of the gas tube is connected directly to ground.

The winding 17 of the transformer 4 connects the grid of video amplifier tube 18 to ground. The cathode of tube 18 is connected to ground through resistor 19, to provide a negative bias for the tube. The resistor is bypassed by capacitor 20. The anode of the video amplifier tube 18 is connected to a source of positive potential through winding 21 of the blocking oscillator transformer 22.

Winding 23 of the transformer 22 has one terminal connected to ground through capacitor 24 and the other terminal is connected to the grid of blocking oscillator tube 25. The grid of this tube is connected to the midpoint of a voltage divider consisting of resistors 26 and 27 with resistor 26 connected to a source of negative bias and resistor 27 connected to ground. This produces a negative bias of the proper value on the grid of tube 25. Winding 28 of the transformer 22 connects the grid of tube 16 to a source of negative potential.

The receiver-transmitter 1 is preferably of the type where the same tube is used to receive and transmit. When a pulse is received through the antenna the pulse will be applied to winding 3 of transformer 4 and will be impressed on the grid of the video amplifier tube 18 by means of winding 17. This tube will amplify this signal and apply it to the grid of the blocking oscillator tube 25 through the transformer 22. This initiates the blocking oscillator action and will cause the blocking oscillator tube to draw a heavy pulse of anode current through winding 21 of transformer 22. This pulse of current induces a large pulse of voltage in winding 28 which is impressed on the grid of gas tube 16. The polarity is so chosen that the pulse on the grid is positive and of sufficient amplitude to overcome the large negative bias already on the tube, thereby causing the gas tube to conduct heavily. When the gas tube conducts, the pulse forming line discharges through winding 5 of transformer 4 inducing a large, sharp pulse of voltage in winding 3. Winding 3 is connected so as to apply a positive pulse to the transmitter-receiver. A large pulse of voltage is also induced in winding 17 of transformer 4. This results in a negative pulse being applied to the grid of the video amplifier tube and prevents the low grid to cathode impedance of this tube from loading the circuit during the pulse.

It will be apparent that there may be deviations from the invention as described which still fall fairly within the spirit and scope of the invention.

Accordingly I claim all such deviations which fall fairly within the spirit and scope of the invention as identified in the hereinafter appended claims.

What is claimed is:

1. A modulator for a radio beacon comprising means including a vacuum tube for amplifying a first trigger pulse, means controlled by the output of said amplifying means for generating a second trigger pulse, a pulse forming line, means controlled by said second trigger pulse for discharging said pulse forming line and means for applying the pulse from said pulse forming line to a transmitter and simultaneously applying a negative pulse to said vacuum tube.

2. In a modulator for a radio beacon, means for translating a first pulse, means responsive to the output of said translating means for generating a second trigger pulse, a pulse forming line, and means controlled by said second trigger pulse for discharging said pulse forming line, and means controlled by said pulse forming line for supplying a disabling pulse to said translating means.

3. In a radio beacon, a transmitter-receiver, means for translating a first pulse from said receiver, means responsive to the output of said translating means for generating a second trigger pulse, a pulse forming line, means controlled by said trigger pulse for discharging said pulse forming line, means for applying a pulse from said pulse forming line upon discharge thereof to said transmitter, and means controlled by said applying means for supplying a disabling pulse to said translating means.

4. In a radio beacon: a pulse transmitter-receiver; a transformer having at least three windings, the first winding of said transformer connecting said transmitter-receiver to the positive terminal of a source of potential; a pulse forming line having an input and an output side; the second winding of said transformer connecting the output side of said pulse forming line to a point of reference potential; resistor means connecting the input side of said pulse forming line to the positive terminal of a source of charging potential; both said sources of potential having negative terminals connected to said point of reference potential; a vacuum tube amplifier having an anode, a cathode and at least one grid; the third winding of said transformer connecting said grid of said tube to said point of reference potential; pulse producing means connected to be triggered by the output of said vacuum tube amplifier; a gas tube having at least one control grid, a cathode connected to said point of reference potential, and an anode connected to the input side of said line; and means impressing the output of said pulse producing means upon said grid of said gas tube, whereby said pulse forming line discharges through said second winding of said transformer; the windings of said transformer being so arranged that a pulse received by said transmitter-receiver and impressed upon said first winding is transferred to said third winding to be amplified by said amplifier and then triggers said pulse producing means, the triggering of said pulse producing means causing said gas tube to discharge said pulse forming line through said second winding in a manner such that a negative pulse is applied to the grid of said amplifier while a pulse is induced in said first winding to trigger said transmitter-receiver.

5. In a radio beacon: a transformer having at least three windings; a point of reference potential; a pulse forming line connected to said point of reference potential through a first winding of said transformer; a source of potential whose negative terminal is connected to said point of reference potential, said pulse forming line being coupled to the positive terminal of said source of potential and being charged thereby; a transmitter-receiver connected to the positive terminal of said source of potential through a second winding of said transformer; a blocking oscillator having its input coupled to one side of a third winding of said transformer, the other side of said third winding being connected to said point of reference potential; a normally cut-off gas tube having an anode, a cathode connected to said point of reference potential, and at least one triggering control grid; means electrically connecting said grid of said gas tube to the output from said blocking oscillator; and means connecting the anode of said gas tube to said positive terminal of said source of potential; whereby said pulse forming line will be discharged through said first winding and said gas tube when said blocking oscillator is triggered by said transmitter-receiver and applies a pulse through said transformer to said transmitter-receiver.

JOHN C. REED, Jr.

REFERENCES CITED

The following references are of record in the file of this patent:

UNITED STATES PATENTS

| Number | Name | Date |
|---|---|---|
| 2,405,069 | Tonks | July 30, 1946 |